July 11, 1933.  F. T. HAGUE  1,917,969
OILING SYSTEM FOR BEARINGS
Filed Dec. 19, 1930    2 Sheets-Sheet 2

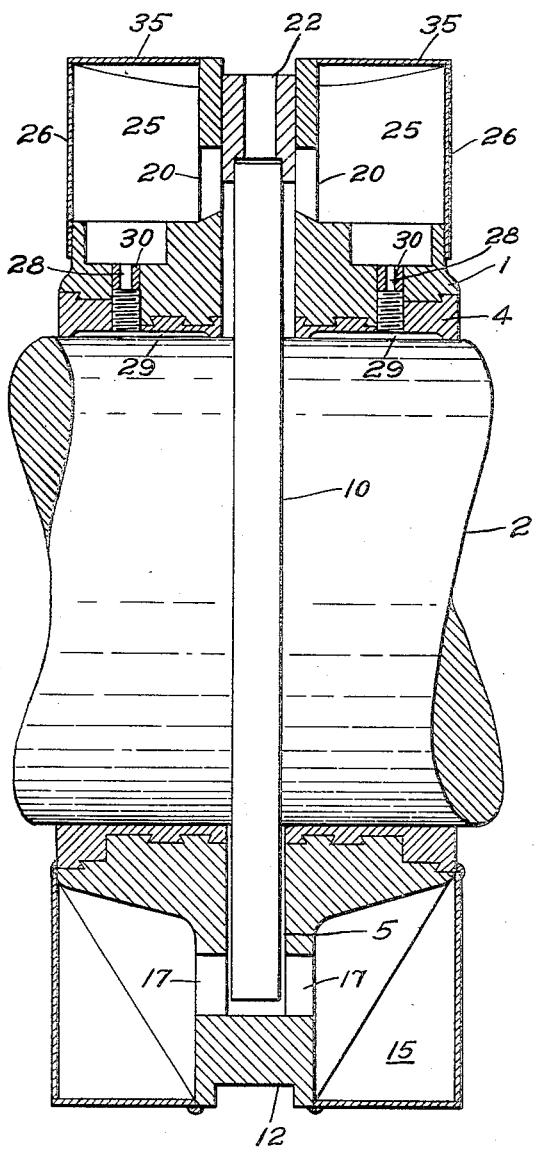
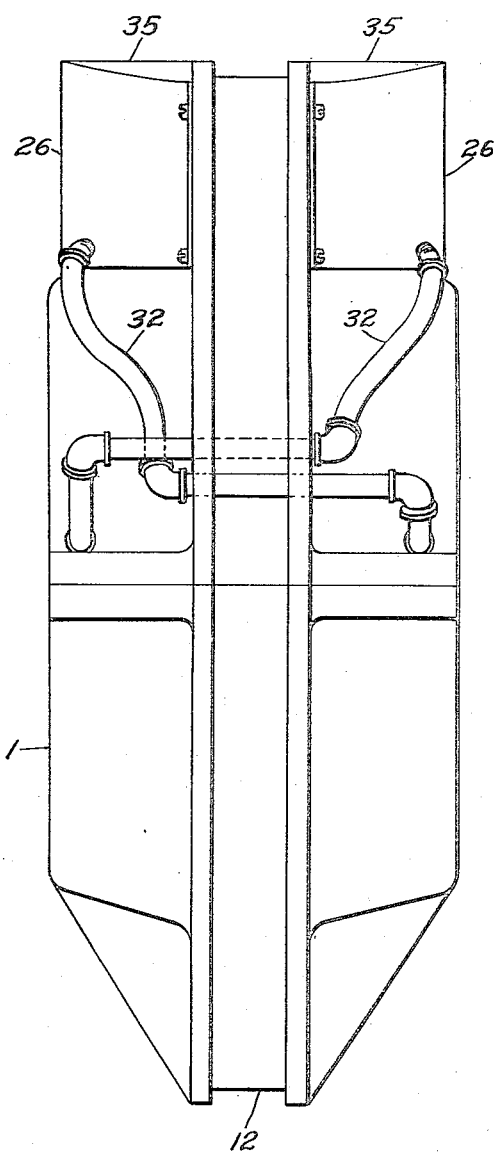

WITNESSES:

INVENTOR
Floyd T. Hague.
BY
ATTORNEY

Patented July 11, 1933

1,917,969

UNITED STATES PATENT OFFICE

FLOYD T. HAGUE, OF PITTSBURGH, PENNSYLVANIA, ASSIGNOR TO WESTINGHOUSE ELECTRIC & MANUFACTURING COMPANY, A CORPORATION OF PENNSYLVANIA

OILING SYSTEM FOR BEARINGS

Application filed December 19, 1930. Serial No. 503,372.

My invention relates to oiling systems for bearings and particularly to such systems as are applied to motor bearings for submarines.

Bearings for ship machinery have been the source of much annoyance and have greatly complicated the problems accompanying the installation of equipment on shipboard. Much of this trouble resides in the difficulty attendant on the proper lubrication of such bearings.

Force feed is one possible solution of the trouble, but space is at a premium on shipboard, and, as force-feed systems are necessarily somewhat bulky, they have found little demand for marine work, and, even where used, they have only partially solved the problem.

Standard ring-oilers have been used, but, when the shaft was inclined, the rings "froze" to the side of the ring-groove, and, frequently, the bearing burned out before oil circulation was restored.

Because of these drawbacks to the standard oiling systems, it has long been customary to specify disc oiling for marine bearings. A disc oiler comprises a disc housed in the central portion of the bearing and rotating with the shaft for carrying oil to the bearing surfaces and, while reliable in many respects, such oilers have some serious disadvantages, the outstanding of which is a tendency to carry oil only on the under side of the disc or collar when the ship pitches. This causes oil to be supplied only to one half of a bearing at a time. If the period of the pitch is relatively long, one half of the bearing may be burned out because of poor lubrication, even though one half of the bearing may be receiving more than the normal quantity of oil.

In submarines, this trouble is further magnified by comparatively long periods of operation at inclinations as great as 30°, as when submerged or emerging or if the submarine becomes stuck in the mud it may be necessary to operate at an angle for long periods.

My invention relates to a disc-type oiling system adapted for installation on shafts subject to a pitch of 30° in either direction, as well as extreme roll in either direction. My system comprises a plurality of oil reservoirs placed on the top of a bearing in such proper relation that one or both of the reservoirs constantly receives oil, regardless of the inclination of the shaft. My reservoirs are preferably placed at a considerable distance above the center line of the bearing and usually on the topmost part of the bearing at a height sufficient to insure that, when the bearing has been tilted to an angle of 30° in either direction, the lowermost reservoir, that is, the reservoir on the lowered end of the bearing, will be at an appreciable height above oil-receiving grooves on the elevated end of the bearing.

Each of the reservoirs is provided with a controllable opening through which oil is fed to that portion of the bearing on which the reservoir sits. Also, each reservoir is provided with cross-feed pipes extending to the opposite end of the bearing and making connection at about the parting line between the upper and the lower parts of the bearing, so that oil in the reservoir on the low end of the bearing will flow through the pipe connection and be delivered to the upper end of the bearing with sufficient head to ensure proper lubrication at the upper end of the bearing.

Other objects and advantages of my invention will be apparent from the following detailed description, taken in conjunction with the accompany drawings, in which Figure 1 is a sectional elevation of a bearing embodying my invention;

Fig. 2 is a side elevation of my improved bearing;

Figure 3:
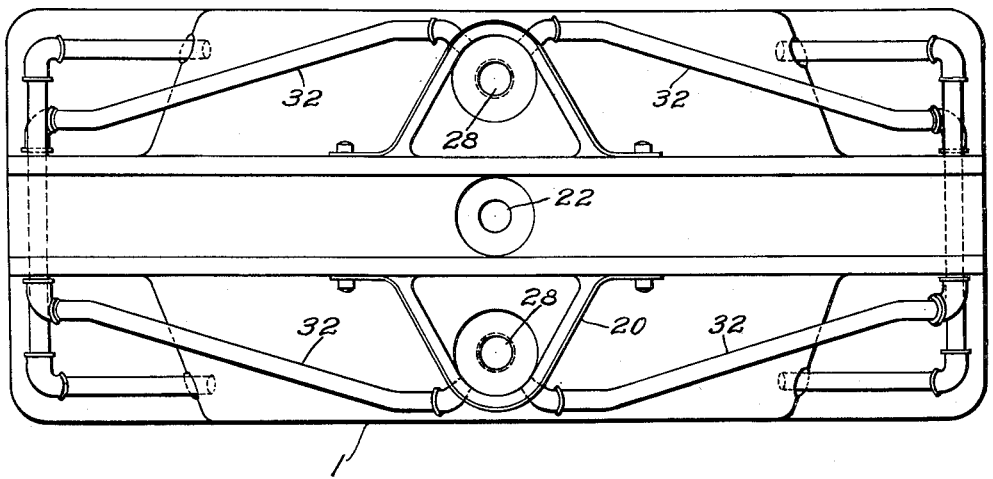
Fig. 3 is a plan view of the same.
Figure 4:
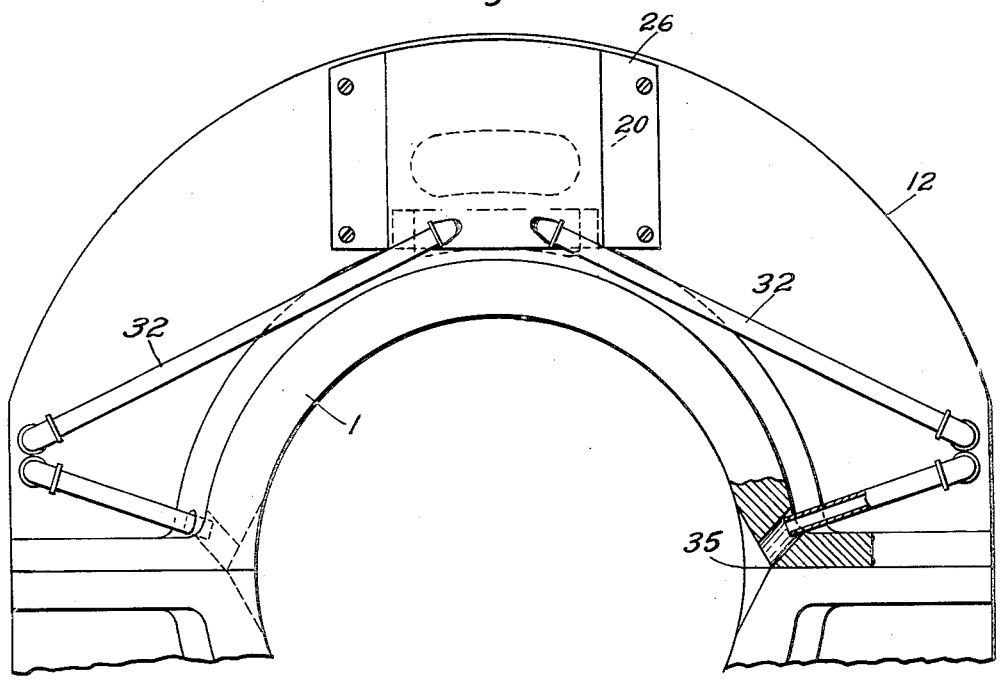
Fig. 4 is a detailed end elevation, parts being broken away to show the cross-piping for delivering oil to the upper side of the bearing.

The apparatus disclosed in the drawings comprises a bearing shell or element 1 adapted to embrace a shaft 2, such as a motor shaft, and having a bearing surface 4 of any desired bearing metal.

The central portion of the bearing element 1 is enlarged to provide a disc chamber 5 in which is located the oil-elevating disc 10, which may be integral with the shaft 2 but preferably is a separate member shrunk upon the shaft and which, if desired, may also cooperate with thrust-bearing blocks (not shown) to carry the thrust of the motor. The external portion 12 of the disc housing is preferably formed as a mounting element for the bearing.

The lower half of the bearing is provided with a well 15, adapted to hold sufficient lubricant for the bearing, and of such dimensions that, when tilted to an angle of 30°, in either direction, the normal oil level is above the lower edge of the oil-elevating disc 10. The well 15 may be an integral portion of the bearing, as shown, or, if desired, it may be a portion of a separate bearing housing. In either case, the lower portion of the disc chamber is provided with suitable perforations 17 to admit lubricant to the elevator disc.

The top portion of the disc chamber is provided with windows 20 through which lubricant is discharged from the elevator disc, preferably by means of a scraper 22 which is so disposed in the top portion of the chamber as to ride on the elevator disc to divert oil from it through the oil windows. An upper oil reservoir or trough 25 is placed on each end of the bearing and in communication with the oil windows. The oil reservoirs or troughs may be integral portions of the bearing casting but I preferably make them of sheet-metal pieces 26 which are welded or otherwise secured to the main portion of the bearing.

Each of the troughs is provided with a lubricant passage 28 extending directly through the bearing shell 1 and in communication with an oil groove 29 in the bearing surface. The oil passage 28 is preferably provided with an oil-control device, such as a removable bushing. Also, each of the troughs 26 is provided with a cross feed pipe 32 extending to the opposite end of the bearing. Preferably, the pipes 32 extend diagonally of the bearing and are bent to any necessary shape to conform closely to its outer surface. The pipes extend laterally across the bearing shell 1 and preferably pass through the outer wall of the disc housing and make connection at substantially the parting line of the top and bottom halves of the bearing, where a V-shaped oil groove 35 is cut in the bearing lining. Preferably, the cross-feed pipes are put both in the front and in the back of the bearing in order that the one or the other of the cross-feed pipes 32 will be in operative relation, regardless of the roll of the ship.

The operation of my oiling system is as follows: the well 15 having been supplied with a sufficient quantity of lubricant, the disc 10, revolving with the shaft 2, elevates the lubricant to the top portion of the disc housing, where it is removed from the disc by the scraper 22 and diverted into one or both of the oil reservoirs 25.

When the keel of the boat is substantially horizontal, oil will be delivered to both of the oil reservoirs 25 and from there fed directly to each end of the bearing through the passages 28, as well as being fed indirectly by the cross piping system. However, when the shaft 2 is tilted in either direction, either by the usual pitching of the craft or by the submerging or emerging inclination of submarines, the disc 10 carries oil only on the under side, so that oil is selectively discharged into the lowermost of the oiling troughs 25, from which it is fed to the lower end of the bearing by the direct passage 28 in the bottom of the reservoir and to the upper end of the bearing through one or both of the cross-connected oil tubes 32.

When front and back cross feed pipes are used, the lubrication will be continuous, regardless of the roll of the ship for, if the roll is sufficient to elevate the discharge end of one of the cross feed pipes sufficiently to decrease the elevational head of the oil in the reservoir, the head on the other pipe will be correspondingly increased and thereby a substantially constant flow of lubricant will be maintained.

In practice, it has been found that, if the elevator disc is made of sufficient capacity to elevate enough lubricating fluid at low speed, it will elevate an excessive amount of lubricant at high speed, so that the reservoirs 25 may overflow. To prevent this, a cover 35 is placed on the top of the reservoirs so that, when an excessive amount of oil is pumped, the oil will escape through the disc chamber instead of overflowing and being lost. The cover, however, may be omitted if the entire bearing is to be placed in a special bearing housing.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A lubricating system for a bearing applied to a shaft subject to inclination up to 30° in either direction comprising a bearing element applied to the shaft, a lubricant well below said bearing, a lubricant-raising disc, said bearing having a chamber enclosing said disc, an upper lubricant reservoir on each end of said bearing, means for selectively feeding lubricant from said disc to the lowermost of said reservoirs when the shaft is inclined, each of said reservoirs having an opening to supply lubricant to that end of the bearing on which it is placed, and means associated with each of said reservoirs for supplying lubricant to the opposite end of said bearing at a point below the top of the bearing.

2. An oil system for a bearing subject to inclination in either direction comprising an oil well in the bottom of the bearing, means for taking oil from said well and elevating the same above the bearing, a plurality of oil-receiving reservoirs above said bearing, means for transferring oil from said lifting means to said reservoirs, and means for conducting oil from each of said reservoirs to both ends of said bearing.

3. An oiling system for a shaft subject to operation at an inclination in either direction comprising a bearing having an enlarged portion intermediate its length, a shaft extending through said bearing and having a flange adapted to be received in said enlarged portion, an oil well in the bottom portion of said bearing, an oil-receiving reservoir on the top of each end of the bearing, means influenced by the direction of inclination for selectively delivering oil to one of said oil-receiving reservoirs, and means for supplying oil from either of said reservoirs to both ends of said bearing.

4. An oiling system comprising a shaft having an oil-raising flange, a bearing having an enlarged section adapted to receive said flange, an oil well so constructed as to supply oil to said flange irrespective of the inclination of the shaft up to 30° tilt, means at the top of the bearing for removing oil from said flange, a plurality of reservoirs for receiving the oil removed from the flange, and means for delivering oil from each of said reservoirs to both ends of the bearing at all inclinations up to 30°.

5. A submarine bearing comprising a rotatable shaft, a relatively short bearing member about said shaft, said bearing member having an annular recess intermediate its ends, a flange on said shaft adapted to be received in said recess, a lubricant well at the bottom of said recess for supplying lubricant to said flange, means at the top of said recess for removing lubricant from said flange, lubricant-receiving means at each side of said recess and above said bearing member, and means for delivering lubricant from each of said receiving means to the opposite ends of said bearing member.

6. A bearing assembly for operation at angles up to 30° comprising a shaft, a bearing about said shaft, an oil-lifting flange on said shaft, said bearing having a recess to receive said flange, an oil well in the bottom of said bearing, means in the top of the bearing for collecting oil from each side of the flange, an oil trough on each side of said flange at the top of the bearing, and means for delivering oil from each of said troughs to both ends of the bearing.

7. A lubricating system for a submarine bearing comprising a shaft, a bottom oil well, an oil-raising element thereon, a bearing about said shaft having a recess to receive said oil-raising element, an upper oil-receiving trough on each end of said bearing, means for delivering oil from said raising element to at least one of said troughs, and means for delivering oil from each of said troughs to both ends of the bearing.

8. An oiling system for a bearing comprising an upper oil reservoir mounted on each end of the bearing, each of said reservoirs having passages for conducting oil from said reservoir directly to the bearing surface and a plurality of oil pipes extending from each of said reservoirs to the opposite end of said bearing at a point below the top of the bearing.

In testimony whereof, I have hereunto subscribed my name this 16th day of December 1930.

FLOYD T. HAGUE.